US011161524B2

United States Patent
Janampally et al.

(10) Patent No.: US 11,161,524 B2
(45) Date of Patent: Nov. 2, 2021

(54) ACCELERATION COMPENSATION DURING ENGINE TORQUE CHANGES

(71) Applicant: TOYOTA MOTOR ENGINEERING & MANUFACTURING NORTH AMERICA, INC., Plano, TX (US)

(72) Inventors: Sandeep Kumar Reddy Janampally, Canton, MI (US); Alejandro M. Sanchez, Ann Arbor, MI (US); Christian Tjia, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 225 days.

(21) Appl. No.: 16/436,605

(22) Filed: Jun. 10, 2019

(65) Prior Publication Data

US 2020/0385013 A1    Dec. 10, 2020

(51) Int. Cl.
*B60W 50/16* (2020.01)
*B60W 20/10* (2016.01)
(Continued)

(52) U.S. Cl.
CPC .......... *B60W 50/16* (2013.01); *B60W 20/10* (2013.01); *B60W 30/025* (2013.01); *F16H 61/04* (2013.01);
(Continued)

(58) Field of Classification Search
CPC .... B60W 50/16; B60W 20/10; B60W 30/025; B60W 2050/0005; B60W 2540/10; F16H 61/04; F16H 59/70; F16H 2059/6807; F16H 59/44; F16H 59/24; F16H 61/0213; F16H 2061/0223
See application file for complete search history.

(56) References Cited

U.S. PATENT DOCUMENTS

| 9,791,041 | B2 | 10/2017 | Jeong et al. | |
| 2008/0114521 | A1* | 5/2008 | Doering | B60W 30/16 701/96 |
| 2017/0045138 | A1* | 2/2017 | Jeong | F16H 61/06 |

FOREIGN PATENT DOCUMENTS

| JP | 3551776 B2 | 8/2004 |
| KR | 1020090055687 A | 6/2009 |

(Continued)

*Primary Examiner* — Marthe Y Marc-Coleman
(74) *Attorney, Agent, or Firm* — Haynes and Boone, LLP

(57) ABSTRACT

Disclosed is a vehicle acceleration compensation system, including an accelerator pedal, throttle, and a transmission configured to shift between two or more fixed gears, wherein each gear relates the motor power to a vehicle torque. The system also includes a control unit configured to receive data from one or more sensors. The control unit includes a real-time throttle map relating the accelerator pedal position to the throttle position, such that a given accelerator pedal position directs a corresponding target throttle position, and a real-time shift map relating a desired transmission gear to a current transmission gear, current vehicle speed, and current throttle position, such that a given vehicle speed, given throttle position, and given transmission gear directs a corresponding target transmission gear. In response to sensor data, the control unit updates the throttle map and shift map such that the vehicle torque is altered to produce a desired acceleration value.

18 Claims, 13 Drawing Sheets

(51) Int. Cl.
*F16H 61/04* (2006.01)
*B60W 30/02* (2012.01)
*B60W 50/00* (2006.01)

(52) U.S. Cl.
CPC . *B60W 2050/0005* (2013.01); *B60W 2540/10* (2013.01)

(56) References Cited

FOREIGN PATENT DOCUMENTS

KR      101360039 B1    2/2014
KR      101914586 B1    11/2018

* cited by examiner

ACCELERATION COMPENSATION DURING ENGINE TORQUE CHANGES

TECHNICAL FIELD

The subject matter described herein relates generally to improving the drivability of a vehicle and, more particularly, to apparatus, systems, and methods to compensate for acceleration pedal response changes during externally caused changes to engine torque. This method has particular but not exclusive utility for consumer and commercial cars and trucks with automatic transmission and internal combustion or hybrid propulsion.

BACKGROUND

Drivers and passengers of motor vehicles desire that increases in accelerator pedal deflection should result in smooth, responsive acceleration. However, traditional linear mapping of pedal position to throttle valve position, combined with fixed shift mapping for automatic transmissions, yields several undesirable results due to the effects of environmental and engine parameters, including periods of flat acceleration before a gear change, sudden dips in acceleration following an upshift, acceleration increases following a downshift, and a "stuck" feeling from remaining in the same gear for too long. This effect may be more pronounced during periods of high-altitude driving, low barometric pressure, high humidity, or high temperature resulting in lower air density, as these conditions reduce the amount of oxygen available for combustion. During any of these conditions there is a gap between customer expectation and actual vehicle acceleration, resulting in a less satisfactory driving experience, as the acceleration is not the same as compared to normal or ideal driving conditions.

Some vehicles have logic that helps to maintain acceleration by compensating engine torque during changes in environmental conditions. However, this logic alone cannot eliminate flat acceleration in a gear or sudden acceleration increase after a downshift due max engine torque limitation. Grade compensation logic compensates flat acceleration in higher gear by altering the shift schedule to delay the upshift based on road grade. Some existing vehicle systems can activate the grade logic even at 0% grade in order to compensate for high elevation or high temperature, but such existing systems can only inhibit upshifting (not alter the overall shift schedule) and only for a certain duration determined by a timer value to prevent a 'stuck' feeling for the driver when the vehicle remains in a fixed gear for too long. Some vehicles also include logic to change the shift schedule in high elevation or high temperature conditions. However, current logic simply changes between fixed shift schedules rather than adapting in real time to meet customer expectations in different engine torque impact conditions.

For these and other reasons, throttle mapping and shift mapping during vehicle acceleration present numerous unaddressed challenges in the art. Accordingly, long-felt needs exist for apparatus, systems, and methods that address the forgoing or other concerns.

The information included in this Background section of the specification is included for technical reference purposes only and is not to be regarded as subject matter by which the scope of the disclosure is to be bound.

SUMMARY

Disclosed are apparatus, systems, and methods for smoothing the acceleration profiles of internal combustion vehicles, hereinafter referred to collectively as a "vehicle acceleration compensation system." The vehicle acceleration compensation system tracks changes in variables that affect the available engine torque of the vehicle, and may control shift mapping and throttle mapping parameters in real time, to maximize, improve, or otherwise modify vehicle performance based on changing values of variables including but not limited to ambient air pressure and ambient air temperature. Some embodiments may also control torque converter lockup.

In some implementations, the vehicle acceleration compensation system, comprises: an accelerator pedal disposed within a vehicle and having an accelerator pedal position; a throttle disposed within the vehicle and configured to supply motor power in proportion to a throttle position; a transmission disposed within the vehicle and configured to shift in a shift direction between two or more fixed transmission gears, wherein each transmission gear relates the motor power to a vehicle torque; and a control unit disposed within the vehicle and configured to receive real-time sensor data from one or more sensors, the control unit comprising: a real-time throttle map relating the accelerator pedal position to the throttle position, such that a given accelerator pedal position directs a corresponding target throttle position; a real-time shift map relating a desired transmission gear to a current transmission gear, current vehicle speed, and current throttle position, such that a given vehicle speed, given throttle position, and given transmission gear directs a corresponding target transmission gear; and wherein in response to the real-time sensor data, the control unit updates the real-time throttle map and real-time shift map such that the vehicle torque is altered to a desired torque value.

Some aspects further comprise a real-time lockup map relating a torque converter lockup condition to the transmission gear, vehicle speed, and throttle position, such that the given vehicle speed, given throttle position, and given transmission gear directs a corresponding lockup condition selected from locked or not locked. In some aspects, the desired torque value is selected to bring the vehicle acceleration into closer conformance with a desired vehicle acceleration profile. In some aspects, the desired torque value is selected to reduce a size or a duration of an increase in vehicle acceleration, or to reduce a period of time wherein the vehicle acceleration is flat. In some aspects, the real-time sensor data comprises at least one of ambient air temperature data, ambient air pressure data, ambient air humidity data, or elevation data. In some aspects, the real-time sensor data comprises at least one of engine air temperature data, engine oil temperature data, engine coolant temperature data, or accessory load data. In some aspects the real-time throttle map is nonlinear. In some aspects, the real-time throttle map is further dependent on the shift direction.

In some implementations, the acceleration compensation system includes a method for adjusting a torque of a vehicle to compensate for environmental conditions, the method comprising: measuring a speed and acceleration of the vehicle; measuring an accelerator pedal position of the vehicle; controlling a throttle of the vehicle based on the accelerator pedal position and a throttle mapping that relates the accelerator pedal position to a throttle position, wherein the throttle position is correlated to a motor power; controlling a transmission of the vehicle to shift in a shift direction from one fixed transmission gear to a selected fixed transmission gear based on a shift mapping that relates a desired transmission gear to the speed of the vehicle and the accelerator pedal position, wherein each transmission gear relates the motor power to a vehicle torque; modifying the throttle mapping in real time based on sensor data; and modifying the shift mapping in real time based on the sensor data, such that the vehicle torque is altered to a desired torque value.

In some aspects, the desired torque value is selected to bring an acceleration of the vehicle into closer conformance with a desired vehicle acceleration profile. In some aspects, the desired torque value is selected to reduce a period of time that the acceleration of the vehicle is flat, to reduce a size or a duration of a dip in vehicle acceleration, or to reduce a size or a duration of an increase in vehicle acceleration. In some aspects, the sensor data comprises at least one of ambient air temperature data and ambient air pressure data. In some aspects, the method further comprises controlling a torque converter lockup of the vehicle to select a lockup state selected from locked or unlocked, based on a lockup mapping that relates a desired lockup state to the speed of the vehicle, the throttle position, and the selected fixed transmission gear; and modifying the lockup mapping in real time based on the sensor data. In some aspects, the throttle mapping is further modified based on the shift direction. In some aspects, the sensor data comprises any of coolant temperature, accessory load, oil temperature, or ambient humidity.

In some implementations, the acceleration compensation system includes an apparatus comprising: a memory comprising: a real-time throttle map relating an accelerator pedal position of a vehicle to a throttle position of the vehicle, such that a given accelerator pedal position directs a corresponding throttle position, wherein a motor power of the vehicle is correlated with the throttle position; a real-time shift map relating a desired transmission gear to a current shift direction, vehicle speed, and throttle position, such that a given vehicle speed, throttle position, shift direction and transmission gear directs a corresponding transmission gear, wherein a torque of the vehicle is correlated with the motor power and the transmission gear; one or more sensors disposed within the vehicle and configured to provide real-time sensor data; and a processor which, in response to the real-time sensor data, updates the real-time throttle map and real-time shift map such that the torque of the vehicle is altered to a desired torque value.

In some aspects, the desired torque value is selected to bring an acceleration of the vehicle into closer conformance with a desired vehicle acceleration profile by reducing a period of time that the acceleration of the vehicle is flat, reducing a size or a duration of a dip in vehicle acceleration, or reducing a size or a duration of an increase in vehicle acceleration. In some aspects, the real-time sensor data comprises at least one of ambient air temperature ambient air pressure, coolant temperature, accessory load, oil temperature, or ambient humidity.

The vehicle acceleration compensation system disclosed herein has particular, but not exclusive, utility for consumer and commercial cars and trucks with automatic transmission and internal combustion or hybrid propulsion.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the method, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
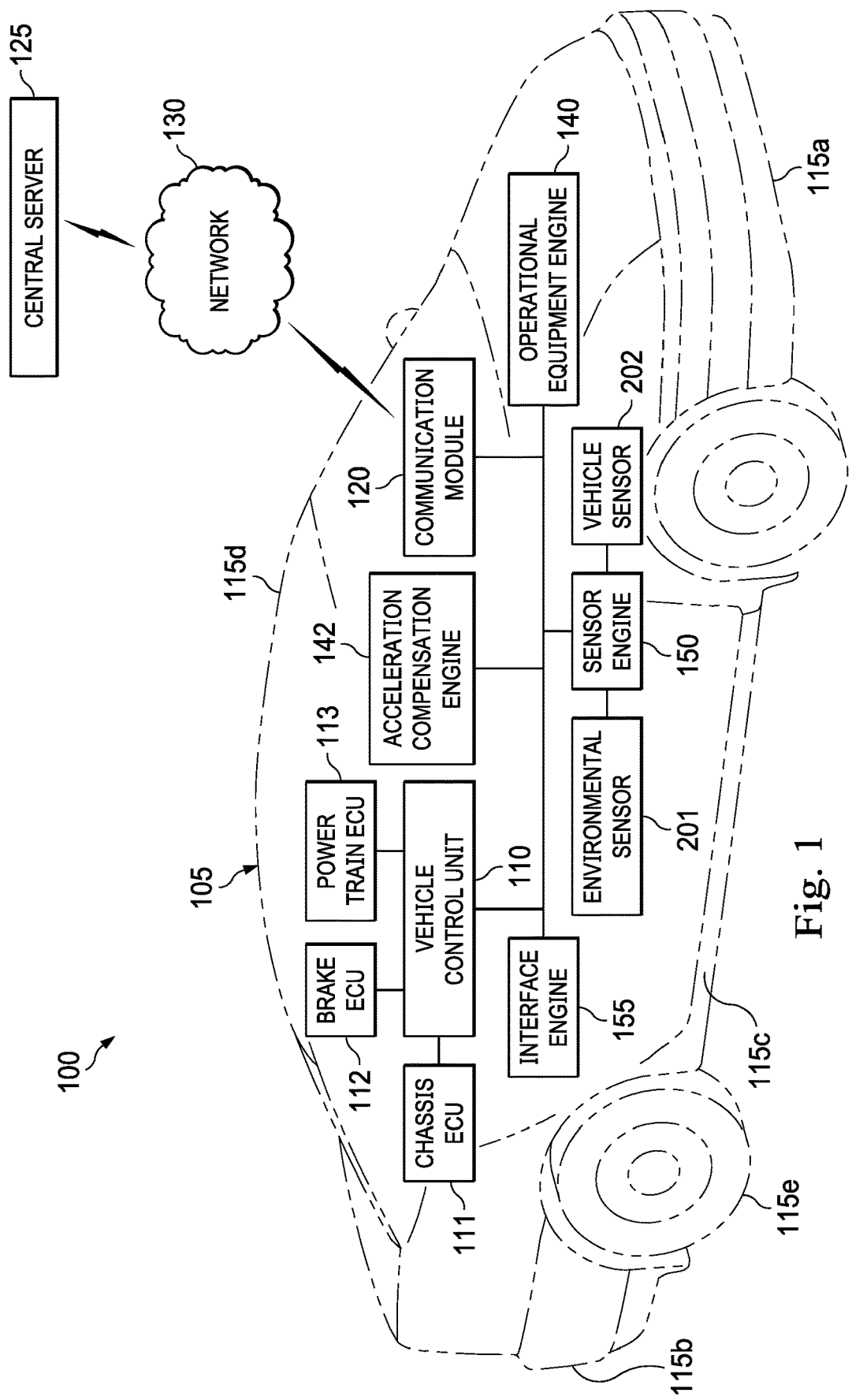
FIG. 1 is a diagrammatic illustration of a vehicle including a vehicle acceleration compensation system, in accordance with at least one embodiment of the present disclosure.

Drivers and passengers of motor vehicles desire smooth, responsive acceleration to result from increases in accelerator pedal deflection. However, traditional linear throttle mapping and fixed shift mapping yields undesirable results, including periods of flat acceleration as well as sudden dips or increases in acceleration, and a "stuck" feeling from remaining in the same gear for too long. These effects may be more pronounced during changes in atmospheric pressure or ambient temperature.

Acceleration demand logic in some existing vehicles helps to maintain acceleration by compensating engine torque during dips or increases in acceleration. However, this logic alone cannot eliminate or substantially reduce flat acceleration during max engine torque limitation in a gear. Grade compensation logic compensates somewhat by altering the shift schedule to delay the upshift. Some existing vehicle systems activate the grade logic even at 0% grade in order to compensate for high elevation or high temperature, but such existing systems, rather than altering the overall shift schedule dynamically, can only inhibit upshifting, and only for a certain duration determined by a timer value to prevent a "stuck" feeling. Some vehicles also include logic to change the shift schedule in high elevation or high temperature. However, current logic simply changes between different fixed shift schedules rather than adapting dynamically in real time to meet customer expectations in different engine torque impact conditions.

Hereinafter referred to as a "vehicle acceleration compensation system," the present disclosure provides apparatus, systems, and methods to help to match vehicle performance to the customer's desired vehicle acceleration response for a given pedal input, by dynamically adjusting the shift timing or shift mapping, engine torque compensation or throttle mapping, and torque converter lockup mapping, continuously in real time.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes, and should not be considered to limit the scope of the vehicle acceleration compensation system. Certain features may be added, removed, or modified without departing from the spirit of the claimed subject matter.

FIG. 1 is a diagrammatic illustration of a vehicle acceleration compensation system in accordance with at least one embodiment of the present disclosure. In an example, a vehicle acceleration compensation system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle acceleration compensation system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain, a one or more environmental sensors 201, one or more vehicle sensors 202, and an acceleration compensation engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Figure 2:
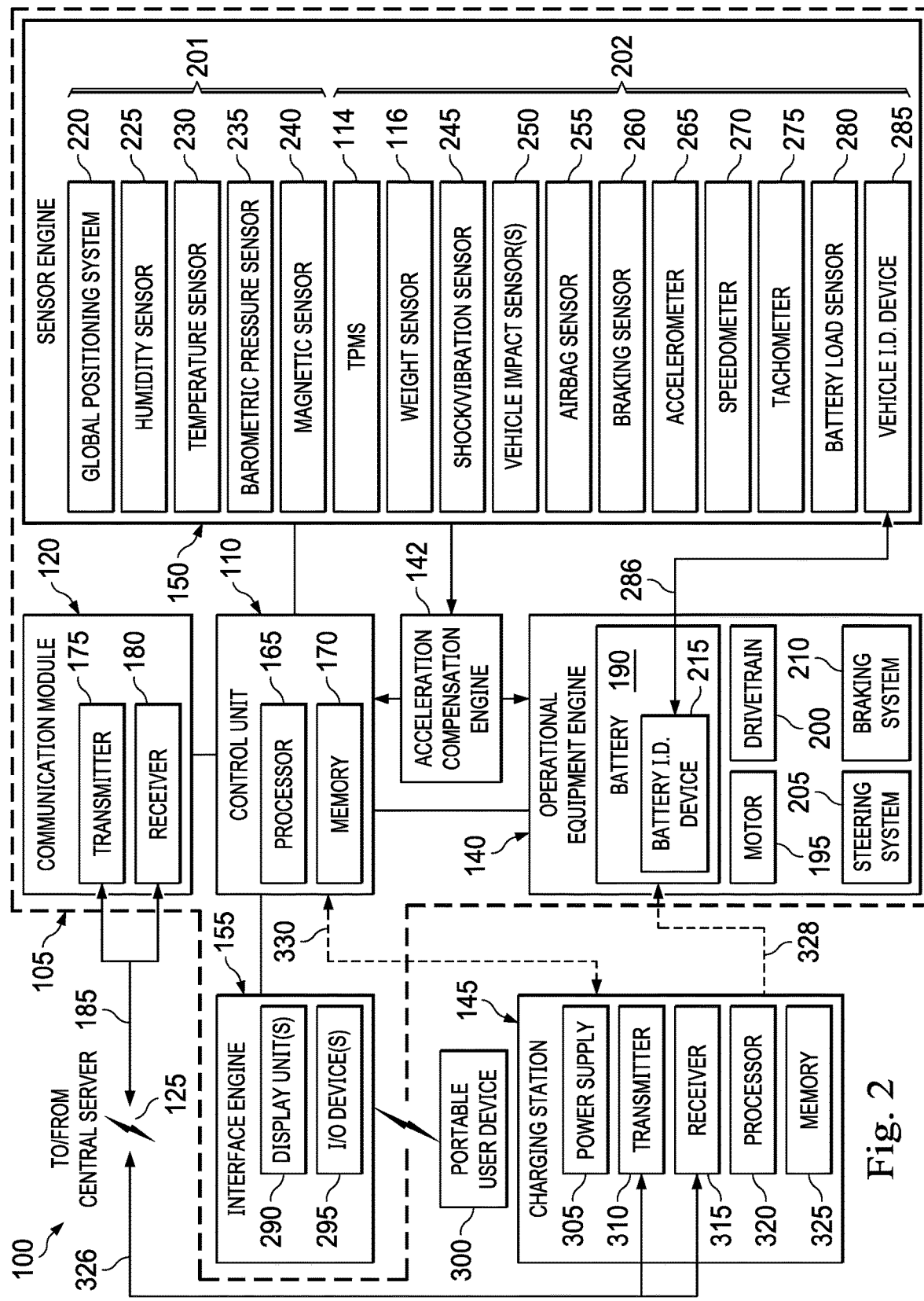
FIG. 2 is a block diagram including several components of the vehicle acceleration compensation system of FIG. 1, in accordance with at least one embodiment of the present disclosure.

FIG. 2 is a diagrammatic illustration, in a block-diagram form, of at least a portion of the vehicle acceleration compensation system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a humidity sensor 225, a temperature sensor 230, a barometric pressure sensor 235, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a TPMS 114, a weight sensor 116, or any combination thereof. The sensors or other detection devices may be configured to sense or detect activity, conditions, and circumstances in an area to which the device has access, e.g., ambient conditions or conditions within a battery compartment. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried onto the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The acceleration compensation system 100 also includes a acceleration compensation engine 142, the operation of which will be described below. In some embodiments, the acceleration compensation engine 142 comprises a stand-alone housing with its own processor and memory. In other embodiments, the acceleration compensation engine exists as software, firmware, or hardware within another processor, such as the vehicle control unit 110, operational equipment engine 140, or power train ECU 113. The sensor engine 150 includes environmental sensors 201 and vehicle sensors 202.

A reader of ordinary skill in the art will understand that other components or arrangements of components may be found in a vehicle 105, and that the same general principles apply to electric vehicles, internal combustion vehicles, and hybrid vehicles.

Figure 3:
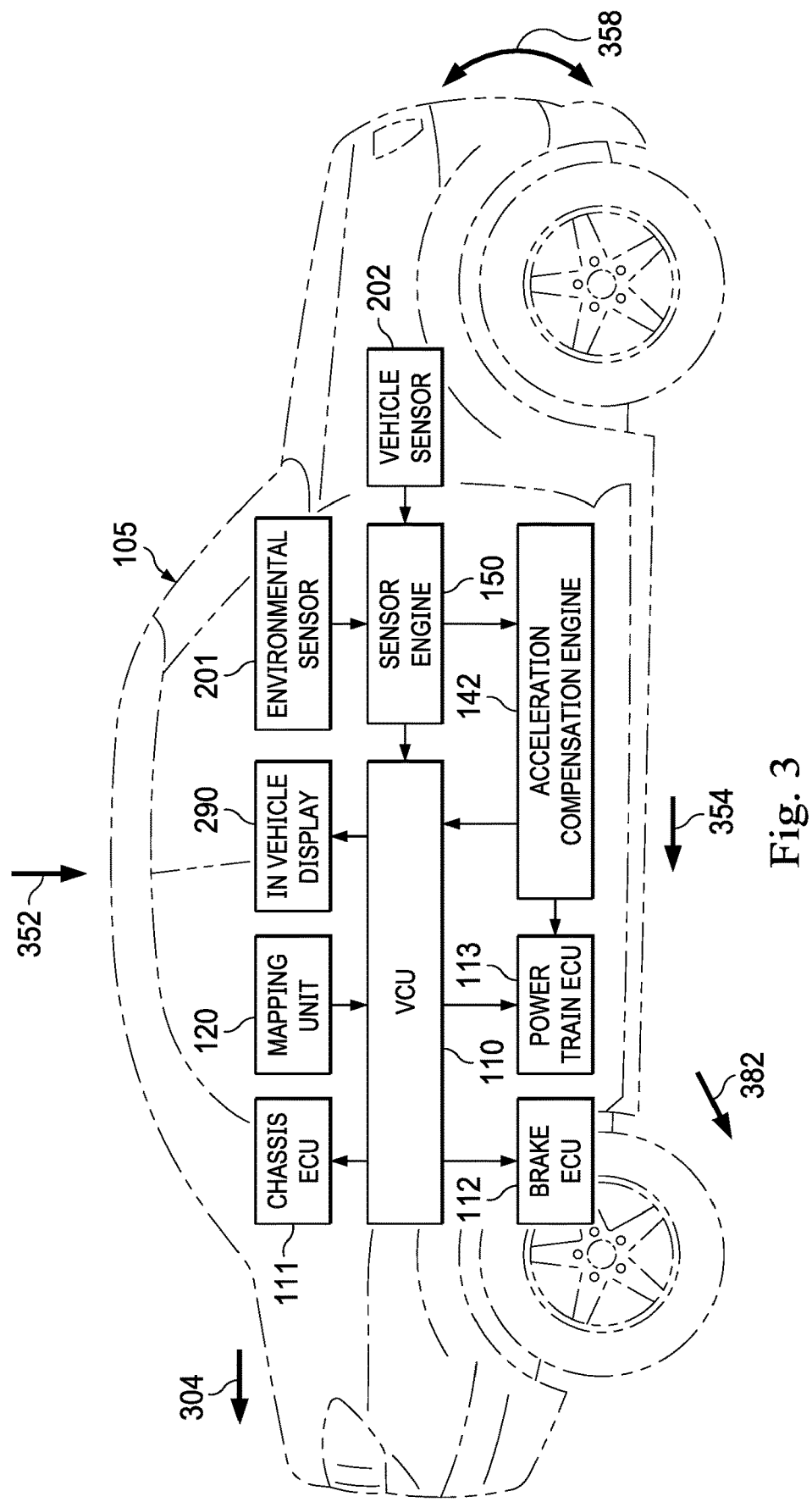
FIG. 3 is an exemplary diagrammatic illustration of the vehicle acceleration compensation system as a vehicle in accordance with at least one embodiment of the present disclosure.

FIG. 3 is an exemplary diagrammatic illustration of the vehicle acceleration compensation system 100 embodied as a vehicle 105 in accordance with at least one embodiment of the present disclosure. In this implementation, for clarity, only certain engines, systems, and components are shown. However, other engines, systems, and components, including those describe herein, are also contemplated as being a part of the vehicle acceleration compensation system 100 shown in FIG. 3. In this example, within the vehicle 105 the VCU 110 receives information from a sensor engine 150, which receives information from environmental sensors 201 and vehicle sensors 202. In addition, the VCU 110 sends information to the chassis ECU 111, brake ECU 112, power train ECU 113, and in-vehicle display 290.

Force variables that may be incorporated into physics calculations within the VCU 110 include but are not limited to the vehicle absolute weight 352, vehicle rolling friction 354, vehicle aerodynamic drag 304, and vehicle pitch 358. In some examples, each of these variables is a force that may be expressed in lbf, Newtons, or any other unit of force as desired. In an example, the vehicle pitch 358 is stored within the memory 170 of the Vehicle Control Unit 110, and is calculated based on data from the accelerometer 265 to provide a sensed acceleration, and the first derivative of the vehicle speed 270 from the speedometer 270 to provide an acceleration value tangent to the road surface. The difference between these two acceleration vectors indicates vehicle pitch 358. Vehicle pitch may also be measured with an inclinometer or geomagnetometer.

Other variables may not be directly known, but may be estimated from graphs, curves, or lookup tables for a nominal vehicle (e.g., vehicle weight 352, vehicle rolling friction 354, and vehicle aerodynamic drag 304). Some variables may be calculated or estimated from performance variables that normally exist within the VCU 110. For example, the combined mass, gross weight, or inertia of the vehicle 105 may be determined from the acceleration profile of the vehicle given a known force imparted by the motor 195 and drivetrain 200, and the Newtonian relationship F=ma. The mass of the carried load may then be estimated by subtracting a nominal or expected vehicle mass (e.g., stock weight or stock mass. Alternatively, if the road grade is known (e.g., from GPS data), the combined vehicle and carried load mass may be estimated based on the work or energy required for the operational equipment engine to push the vehicle uphill, or the force required hold it from rolling backward.

The total drag on the vehicle can be calculated based on the power output required to maintain a particular vehicle speed 270, and the sum of nominal or estimated values of the vehicle rolling friction 354 and aerodynamic drag 304. The ratio of aerodynamic drag to rolling friction can be estimated from known relationships for typical vehicles, or by other methods. The grade of the road or ground surface under the vehicle may be calculated from accelerometers, or may be calculated or taken directly from stored maps, GPS data or other indicators. The combination of vehicle weight 352, vehicle aerodynamic drag 304, and vehicle rolling friction 354 can be used to compute a vehicle rolling resistance vector 382 (e.g., as a vector sum of the force vectors). Histories, time averages, first derivatives, integrals, or filters of any of the aforementioned variables, along with known, anticipated, or estimated future values for some or all of the variables may also be incorporated into the physics calculations to improve or refine the results of the calculations. Accelerator pedal position may also be incorporated as being proportional to an expected power output from the motor 195.

The acceleration compensation system 100 also includes an acceleration compensation engine 142, which accepts inputs from the sensor engine (e.g., inputs from the temperature sensor 230 and pressure sensor 235) and provides outputs, for example, to the VCU 110 or power train ECU 113.

Figure 4A:
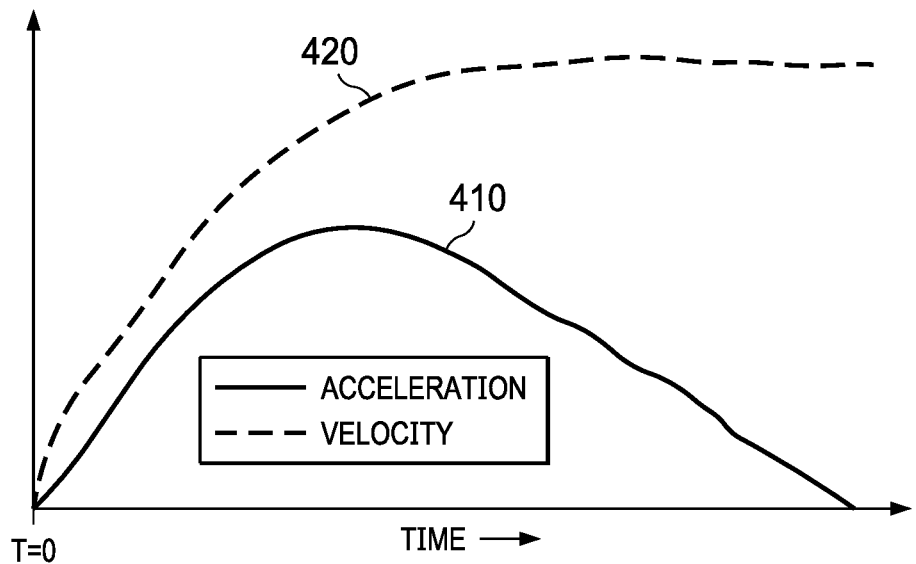
FIG. 4a is a diagrammatic representation of a desirable acceleration curve and velocity curve in response to an increase in accelerator pedal deflection in accordance with at least one embodiment of the present disclosure.

FIG. 4a is a diagrammatic representation of a desirable acceleration curve 410 and velocity curve 420 in response to an increase in accelerator pedal deflection. The X-axis of the diagram represents increasing time (with T=0 representing the start of the acceleration event), and the Y-axis of the diagram represents either acceleration or velocity, with T=0 representing either zero velocity and acceleration (i.e., a standing start), or else a nonzero velocity and/or acceleration (i.e., acceleration from an intermediate cruising speed). The desirable acceleration profile 410 increases smoothly from zero to a peak value, and then declines smoothly thereafter, exhibiting no increases, decreases, or flat spots that deviate from this smooth function. The desirable velocity profile 420 increases smoothly from a starting value to an ending value, again exhibiting no other increases, decreases, or flat spots. The expectations of vehicle drivers and passengers are generally believed to match these desired curves, and to be violated by significant variations therefrom.

Figure 4B:
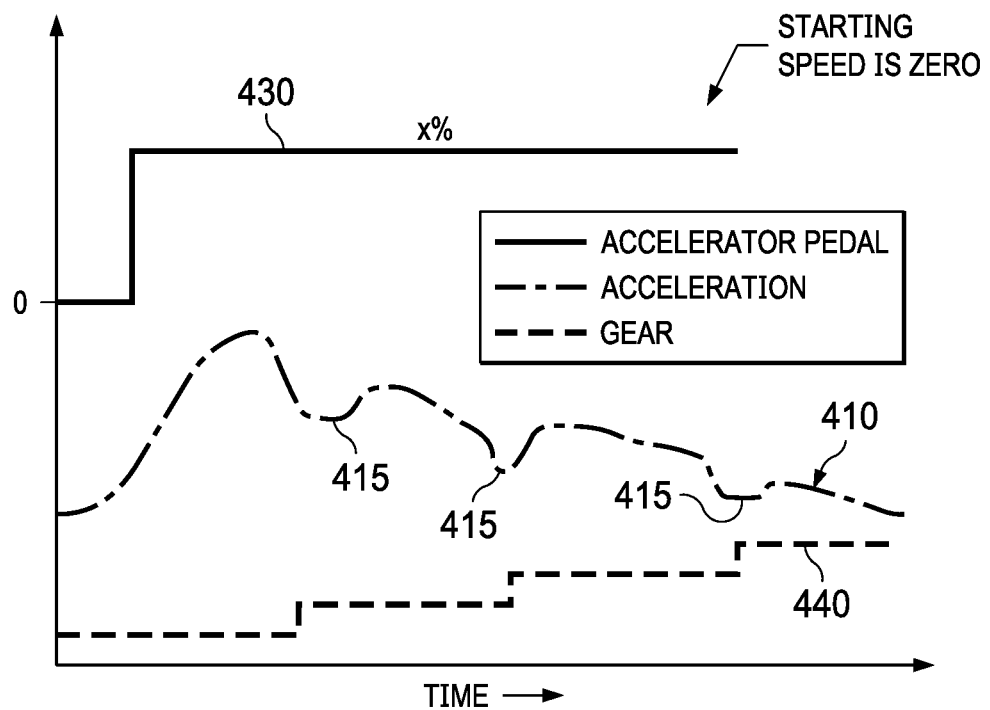
FIG. 4b is a diagrammatic representation of exemplary acceleration demand logic of the vehicle acceleration compensation system in accordance with at least one embodiment of the present disclosure.

FIG. 4b is a diagrammatic representation of exemplary acceleration demand logic of the vehicle drive force compensation system 100 in accordance with at least one embodiment of the present disclosure. The X-axis of the diagram represents increasing time from a standing start (i.e., acceleration from a starting speed of zero). The Y axis represents three values for a representative example vehicle: acceleration 410, accelerator pedal position 430, and gear selection 440. The accelerator pedal 430 begins at a resting position (i.e., zero deflection, commanding zero acceleration), and increases as a step function to a nonzero deflection (e.g., a $\frac{1}{3}^{rd}$ depressed, 50% depressed, or fully depressed accelerator pedal 430), where it remains for the duration of the depicted time period. The gear selection 440 (i.e., the gear selected by an automatic transmission system or drivetrain 200) increases in three separate increments, from $1^{st}$ gear to $2^{nd}$ gear, then from $2^{nd}$ gear to $3^{rd}$ gear, and from $3^{rd}$ gear to $4^{th}$ gear.

As will be understood by a person of ordinary skill in the art, in the absence of compensation logic, this shift schedule results in an acceleration profile wherein the acceleration rises to a peak value, then declines at a non-constant rate, with marked dips 415 occurring in association with the shifts in gear. Such dips 415 in the acceleration profile 410 are readily perceptible to a vehicle's driver and passengers, and are generally believed to contribute to an undesirable driving experience as they conflict with the desirable acceleration profile 410 shown in FIG. 4a. The existence, timing, and size of such dips is vehicle-dependent and based on shift quality, which is a function of variables such as transmission design and transmission oil pressure. Reducing such dips 415 or otherwise rendering them less perceptible to drivers and passengers is addressed by the present disclosure, in the sense that torque changes will result in acceleration changes at these times.

Figure 5:
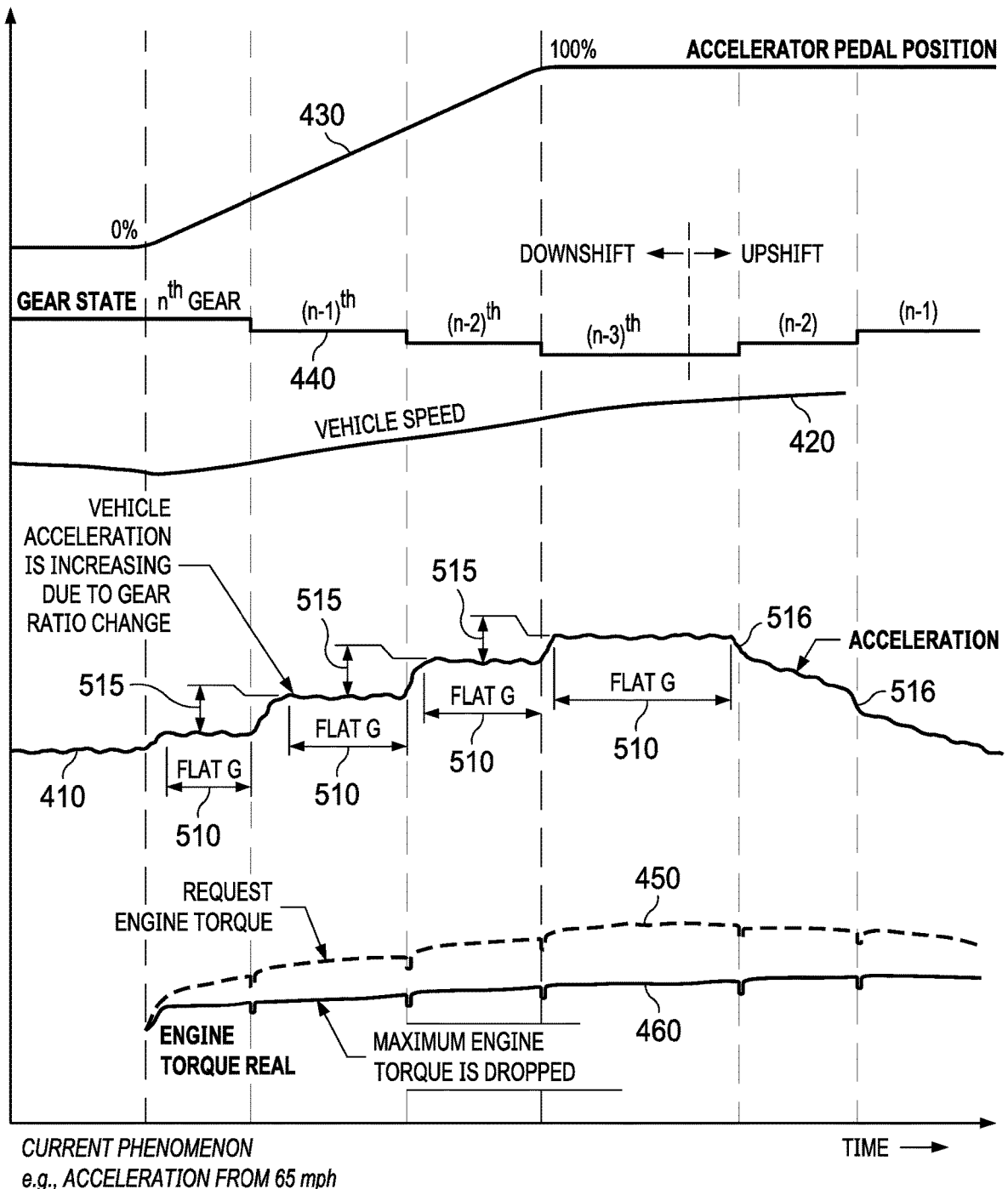
FIG. 5 is a diagrammatic representation of exemplary acceleration demand logic of the vehicle acceleration compensation system in accordance with at least one embodiment of the present disclosure.

FIG. 5 is a diagrammatic representation of exemplary acceleration demand logic of the vehicle acceleration compensation system 100 in accordance with at least one embodiment of the present disclosure. This depiction is similar to that of FIG. 4b, except that the accelerator pedal angle 430 is increased smoothly across the entire time period, from zero deflection to full deflection, and the acceleration begins at a nonzero cruising speed (e.g., 65 MPH). This results in the transmission gear 440 undergoing three downshifts of the transmission 200 (e.g., from $6^{th}$ gear down to $5^{th}$ gear, from $5^{th}$ gear down to $4^{th}$ gear, and from $4^{th}$ gear down to $3^{rd}$ gear) representing increasing torque delivered from the motor 195 to the wheels 115 of the vehicle 105, and then two upshifts, representing reduced RPM and fuel consumption of the motor 195 at high speed.

This results in an acceleration profile 410 which exhibits significant flat spots 510 in the time period leading up to a downshift of the transmission 200, followed by sharp increases 515 in the moments of time immediately following the downshift. The acceleration profile 410 also exhibits sharp drops 516 immediately following each upshift of the transmission 200. As with FIG. 4b, this acceleration profile 410 creates an undesirable mismatch with the expectation of a smooth and responsive acceleration profile 410 as depicted for example in FIG. 4a.

The figure also shows a torque request profile 450, representing the expected torque output of the motor 195 through the transmission or drivetrain 200 to the wheels 115 of the vehicle 105. However, as a result of one or more engine torque impacts 680, the actual delivered torque is reduced, as shown in curve 460.

Figure 6:
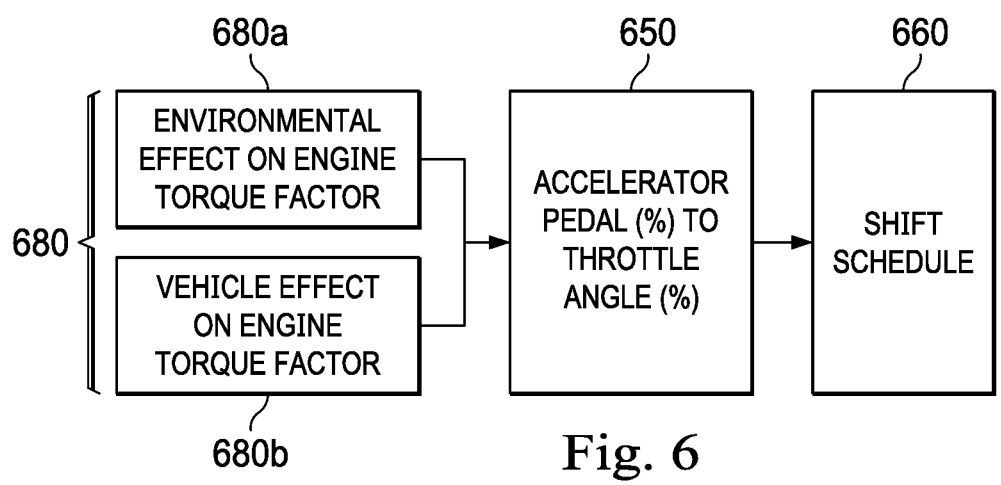
FIG. 6 is a diagrammatic representation of exemplary acceleration compensation logic of the vehicle acceleration compensation system in accordance with at least one embodiment of the present disclosure.

FIG. 6 is a diagrammatic representation of exemplary acceleration compensation logic of the vehicle acceleration compensation system 100 in accordance with at least one embodiment of the present disclosure. In this example, the acceleration compensation engine 142 detects effects 680 on engine torque and computes two torque effect factors: an environmental effect factor 680a and a vehicle effect factor 680b. Either within the acceleration compensation engine 142, the VCU 110, or the power train ECU 113, these factors are then used to adjust or compensate the throttle mapping 650, i.e., the instantaneous mapping between accelerator pedal position 430 (i.e., 0-100% depressed) and throttle valve angle (i.e., 0-100% open past idle position). The throttle of the vehicle 105 is configured to supply combustible fuel-air mixture to the motor 195 in proportion to the throttle valve angle, such that a greater throttle valve angle results in grater combustion and therefore greater engine power output or torque.

Finally, the environmental effect factor, vehicle effect factor, and instantaneous throttle mapping are used to adjust or compensate the shift schedule or shift timing 660, i.e., the instantaneous selection of transmission gear 440 and transmission gear changes based on acceleration 410, speed 420, throttle position, and existing or previous transmission gear 440. The adjusted or compensated throttle mapping 650 and shift schedule 660 then result in an improved acceleration profile, as will be described below.

Figure 7:
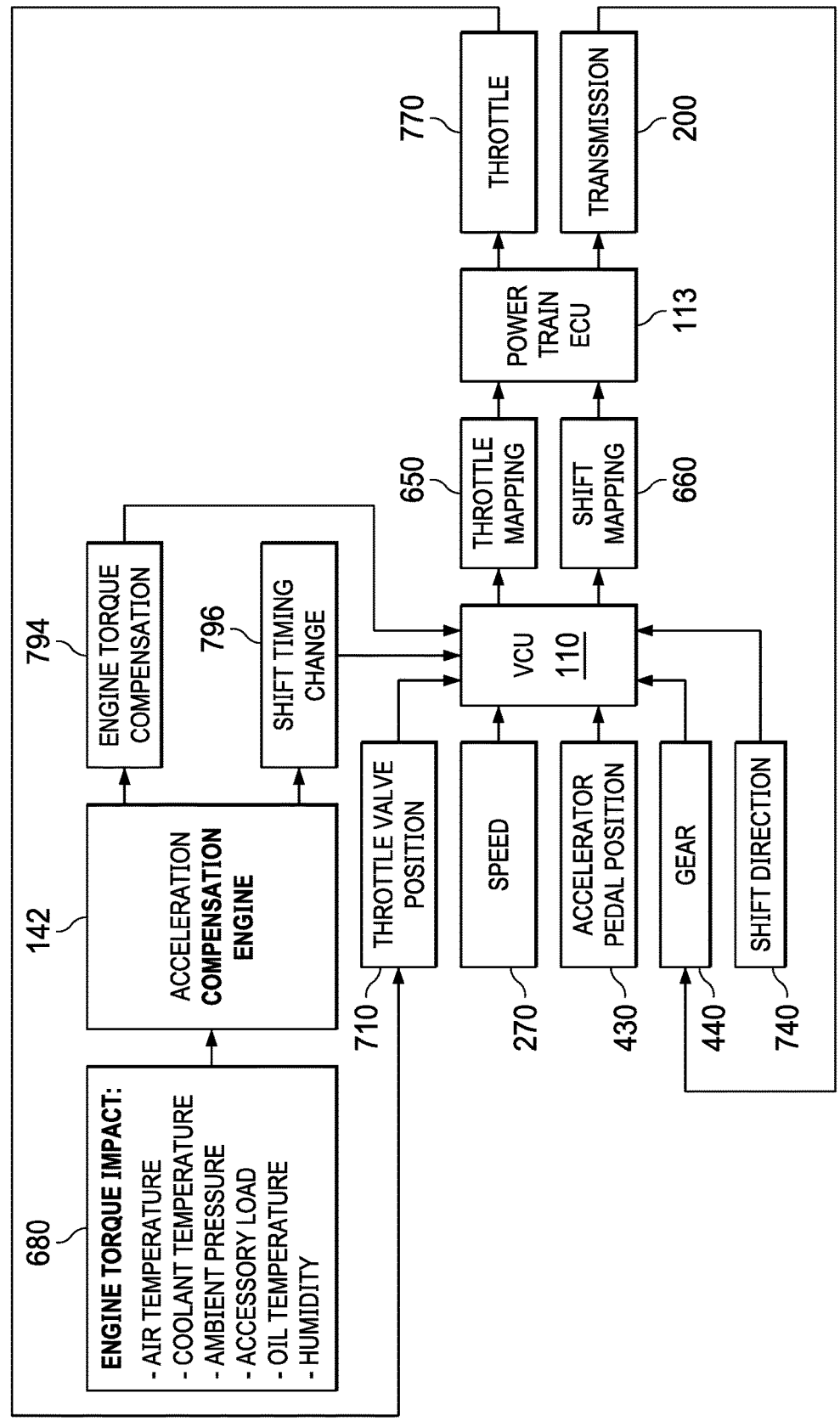
FIG. 7 is a diagrammatic representation of exemplary acceleration compensation logic of the vehicle acceleration compensation system in accordance with at least one embodiment of the present disclosure.

FIG. 7 is a diagrammatic representation of exemplary acceleration compensation logic of the vehicle acceleration compensation system 100 in accordance with at least one embodiment of the present disclosure. This diagram provides a more detailed view of the relationships between processes and variables than that shown in FIG. 6

In this example, during normal operation, the VCU 110 receives input variables including but not limited to throttle valve position 710, speed 270, accelerator pedal position 430, transmission gear 440, and shift direction 640 (i.e., whether a recent or upcoming gear shift is an upshift to a higher gear or a downshift to a lower gear). Based on these values (and potentially others such as road grade and towed or carried load) the VCU 110 computes the throttle mapping 650 and shift mapping 660, which are then passed to the power train ECU 113, which operates the throttle 770 and transmission or power train 200. Adjustments to the throttle 770 result in a new throttle valve position 710. Adjustments to the transmission 200 result in a new gear 440.

In this example, the throttle mapping 650 and shift mapping 660 are also affected by engine torque impacts 680 as described below. The engine torque impacts 680 may include both environmental impacts (e.g., elevation (e.g., from an altimeter or GPS), ambient air temperature, ambient air pressure, ambient humidity) and vehicle impacts (e.g., oil pressure, oil temperature, coolant temperature, engine air temperature and accessory load such as air conditioner, headlights, windshield wipers, etc.). These values are fed into the acceleration compensation engine 142, which computes an engine torque compensation 794 (implemented for example by a motor ECU) and a shift timing change 796 (implemented for example by a transmission or drive train ECU, or a power train ECU controlling both motor and transmission functions), which are fed into the VCU 110. Based on this information, the VCU makes continuous, real-time adjustments to the throttle mapping 650 to adjust engine torque, and also to the shift mapping 660 to change the timing of gear shifts (either earlier or later). These changes smooth out the acceleration profile 410 as described below, with the goal of keeping the relationship between time, pedal position, acceleration, and velocity as close to the desirable relationship as possible. Adjustments made in real time may be made on a timed loop, such as for example every second, every 10 seconds, every minute, etc., and may potentially occur as frequently as the loop time of the processor on which the updates are occurring (e.g., every 40 msec), which may be advantageous under some conditions.

Figure 8:
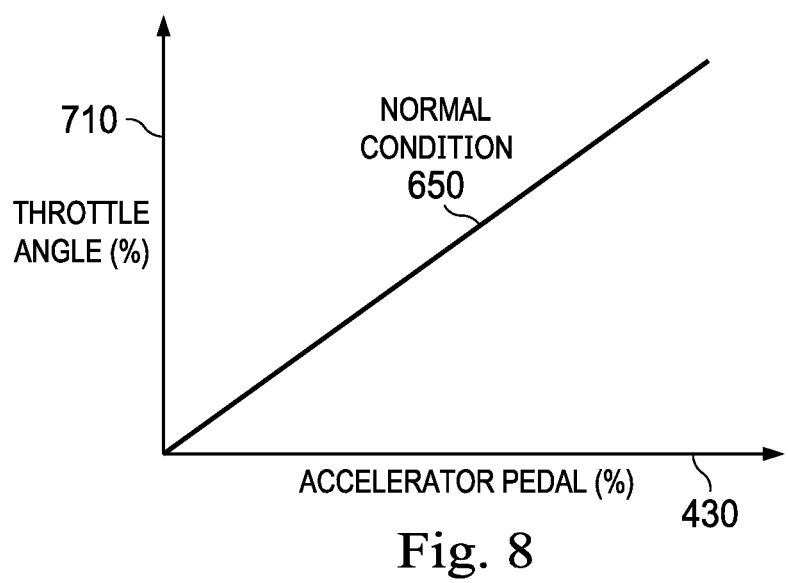
FIG. 8 is a diagrammatic representation of exemplary acceleration compensation logic of the vehicle acceleration compensation system in accordance with at least one embodiment of the present disclosure.

FIG. 8 is a diagrammatic representation of exemplary acceleration compensation logic of the vehicle acceleration compensation system 100 in accordance with at least one embodiment of the present disclosure. Under normal conditions (i.e., without acceleration compensation logic), the throttle mapping 650 (i.e., the relationship between accelerator pedal position 430 and throttle valve position 710) is linear, such that 0% deflection of the accelerator pedal 430 equates to approximately 0% opening of the throttle 770 beyond the idle setting, whereas 50% deflection of the accelerator pedal 430 results in approximately 50% opening of the throttle 770 beyond the idle setting, and 100% deflection of the accelerator pedal 430 results in approximately 100% opening of the throttle 770 beyond the idle setting. This "normal", linear throttle mapping is associated with the acceleration profile 410 shown in FIG. 4b and FIG. 5.

Figure 9A:
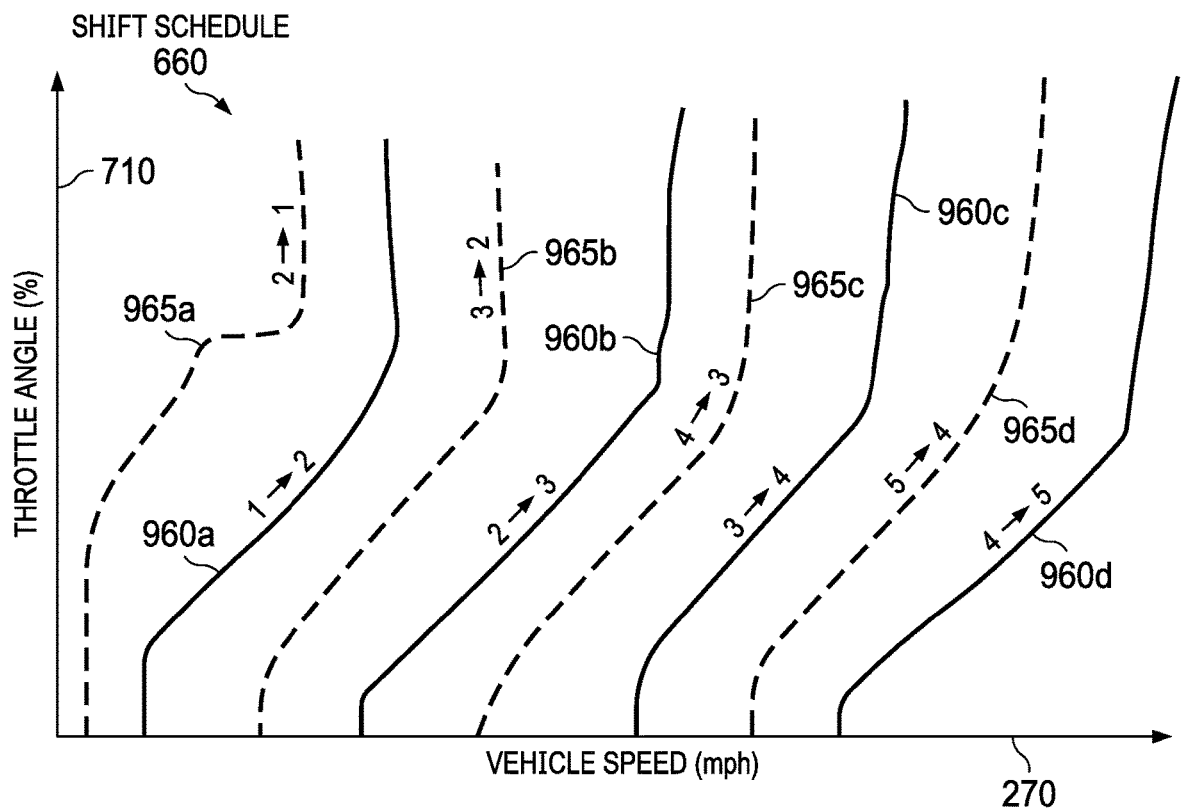
FIG. 9a is a diagrammatic representation of exemplary acceleration compensation logic of the vehicle acceleration compensation system in accordance with at least one embodiment of the present disclosure.

FIG. 9a is a diagrammatic representation of exemplary acceleration compensation logic of the vehicle acceleration compensation system 100 in accordance with at least one embodiment of the present disclosure. In a traditional automatic transmission vehicle 105, the shift schedule or shift mapping 660 (i.e., the relationship between speed 270, throttle angle 710, and transmission gear 440) is the same regardless of engine torque impacts 680 or shift direction 740. This traditional shift schedule or shift mapping 660 is associated with the undesirable acceleration profile 410 depicted in FIG. 4b and FIG. 5.

In the embodiment shown in the FIG. 9a, the shift schedule 660 is adjusted based on torque impacts 680 as described above, and also adjusted based on whether the transmission 200 is shifting into a higher or lower gear 440. The acceleration upshift schedule is shown by the solid lines 960a, 960b, 960c, and 960d, and represents the combinations of speed 270 and throttle angle 710 at which the transmission 200 will shift from first gear to second gear, second gear to third gear, third gear to fourth gear, and fourth gear to fifth gear, respectively. For example, if the transmission 200 is in second gear, and a hypothetical status point, whose X value is the current vehicle speed 270 and whose Y value is the current throttle angle 710, falls to the left of line 960b, the transmission 200 will remain in second gear, whereas if the hypothetical status point falls to the right of line 960b, the transmission 200 will be commanded to switch from second gear to third gear in order to decrease engine RPMs.

The acceleration downshift schedule is shown by the dotted lines 965a, 965b, 965c, and 965d, and represents the combinations of speed 270 and throttle angle 710 at which the transmission 200 will shift from $2^{nd}$ gear to $1^{st}$ gear, $3^{rd}$ gear to $2^{nd}$ gear, $4^{th}$ gear to $3^{rd}$ gear, and $5^{th}$ gear to $4^{th}$ gear, respectively. For example, if the transmission 200 is in third gear, and a hypothetical status point, whose X value is the current vehicle speed 270 and whose Y value is the current throttle angle 710, falls to the left of line 965b, the transmission 200 will remain in third gear, whereas if the hypothetical status point falls to the right of line 965b, the transmission 200 will be commanded to switch from third gear to second gear in order to increase torque.

During typical driving scenarios, the acceleration upshift schedule is followed when the vehicle 105 accelerating normally from a low or zero initial speed 270 to a higher speed 270, and results in reduced engine noise and vibration as well as increased fuel economy. The acceleration downshift schedule is followed when the vehicle 105 is accelerating suddenly (e.g., for passing), or when the vehicle is decelerating As compared with an uncompensated shift schedule or shift mapping 660, the compensated shift schedule or shift mapping 660 shown in in FIG. 9a results in earlier downshifts (i.e., downshifting at a lower speed) and later upshifts (i.e., upshifting at a higher speed, or holding the lower gear for longer), with the goal of altering the acceleration profile 410 and velocity profile 420 to more closely resemble the ideal shown in FIG. 4a as opposed to the profile shown in FIG. 4b.

This exemplary diagram shows a snapshot of the shift mapping for a particular vehicle at a particular instant under particular conditions. It should be understood that in some embodiments of the acceleration compensation system 100 of the present disclosure, the acceleration compensation engine 142, VCU 110, and/or power train ECU 113 continuously recalculate the compensated shift mapping 660 in real time based on the engine torque impacts 680 that are detected at that particular instant. It is noted that if the shift mapping is based on speed and throttle position, then recalculation of the throttle mapping automatically results in a change to the shift mapping. However, in other embodiments the shift mapping may be based on other variables including but not limited to accelerator pedal position 430, torque, drive force, acceleration 410, or other variables, which would replace throttle position as the Y-axis or replace speed as the X-axis of FIG. 9a.

Figure 9B:
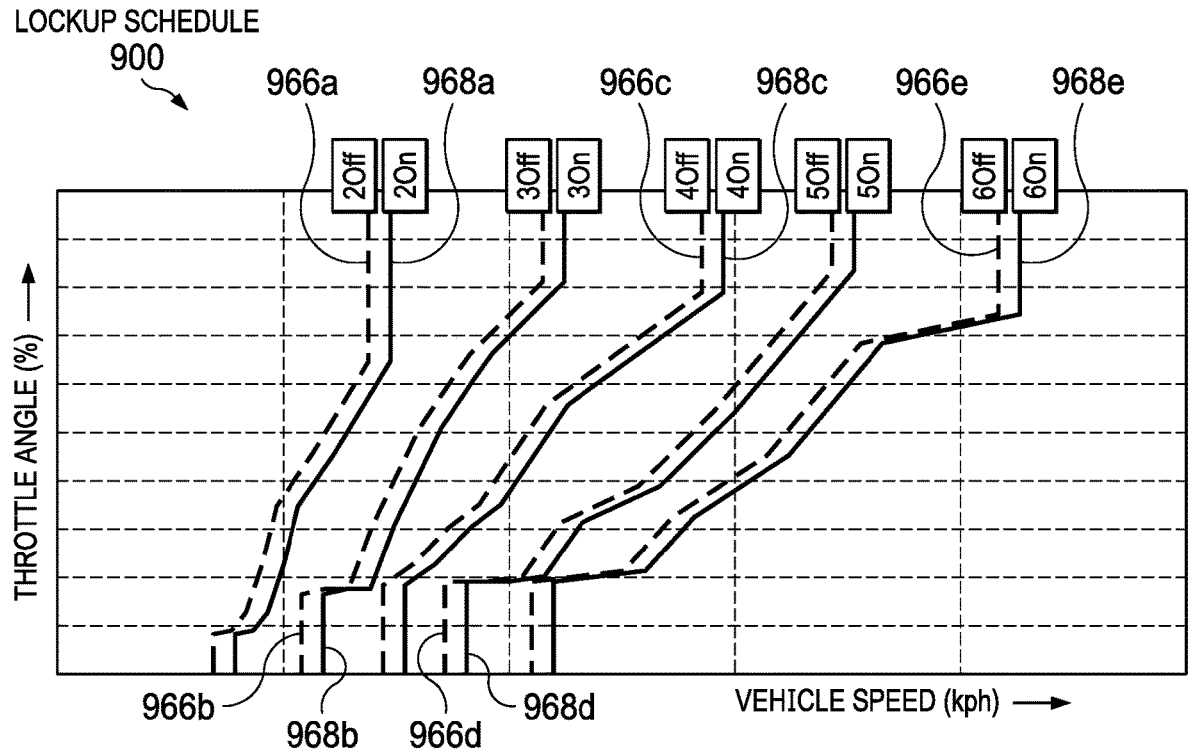
FIG. 9b is a diagrammatic representation of exemplary acceleration compensation logic of the vehicle acceleration compensation system in accordance with at least one embodiment of the present disclosure.

FIG. 9b is a diagrammatic representation of exemplary acceleration compensation logic of the vehicle acceleration compensation system 100 in accordance with at least one embodiment of the present disclosure. FIG. 9b is similar to FIG. 9a, except that it represents a compensated lockup schedule or lockup mapping 900 rather than a shift schedule or shift mapping 660.

In an automatic transmission vehicle, the transmission 200 may include a torque converter, which is a fluid coupling that transfers engine torque into transmission torque. If the transmission 200 is in a torque converter unlocked state (i.e., transmission input RPM does not equal to engine output RPM), then the torque can be multiplied, such that the wheels 115 can receive more torque without the need for the transmission 200 to downshift. However, drivers generally do not like the sensation of the unlocked torque converter state, as there is no direct correspondence between the accelerator pedal position 430 and the acceleration 410 of the vehicle 105. If the transmission 200 is in a torque converter locked state (i.e., transmission RPM equal to engine RPM), then torque is restricted, but customers feel a satisfying correspondence between accelerator pedal position 430 and acceleration 410.

In some embodiments of the present disclosure, the vehicle acceleration compensation system 100 modifies the lockup schedule 900 rather than the shift schedule 660. In other embodiments, the vehicle acceleration compensation system 100 may select dynamically between modifying the shift schedule and modifying the lockup schedule, depending on which one will bring the acceleration profile 410 closer to the desired profile shown in FIG. 4a. In still other embodiments, the shift schedule and lockup schedule may be varied simultaneously, which may be advantageous under some conditions.

Dotted lines 966a, 966b, 966c, 966d, and 966e represent the combinations of throttle angle and speed in gears 2, 3, 4, 5, and 6, respectively, at which lockup is turned off, such that the RPM of the transmission 200 is free to diverge from the RPM of the motor 195. Solid lines 968a, 968b, 968c, 968d, and 968e represent the combinations of throttle angle and vehicle speed in gears 2, 3, 4, 5, and 6, respectively, at which lockup is turned back on. In some embodiments, even the compensated lockup schedule still holds the transmission 200 in an unlocked state for only brief intervals, as can be seen by the narrow separation between each dotted line 966 and its corresponding solid line 968, as compared with the substantially larger separation between each dotted line 960 and the next dotted line 960 in the sequence.

As with FIG. 9a, the Y-axis represents a schedule based on throttle angle and an X-axis based on vehicle speed. However, a person of ordinary skill in the art will understand that either or both of these could be replaced with other variables, including but not limited to accelerator pedal position 430, torque, drive force, or acceleration 410.

Figure 10:
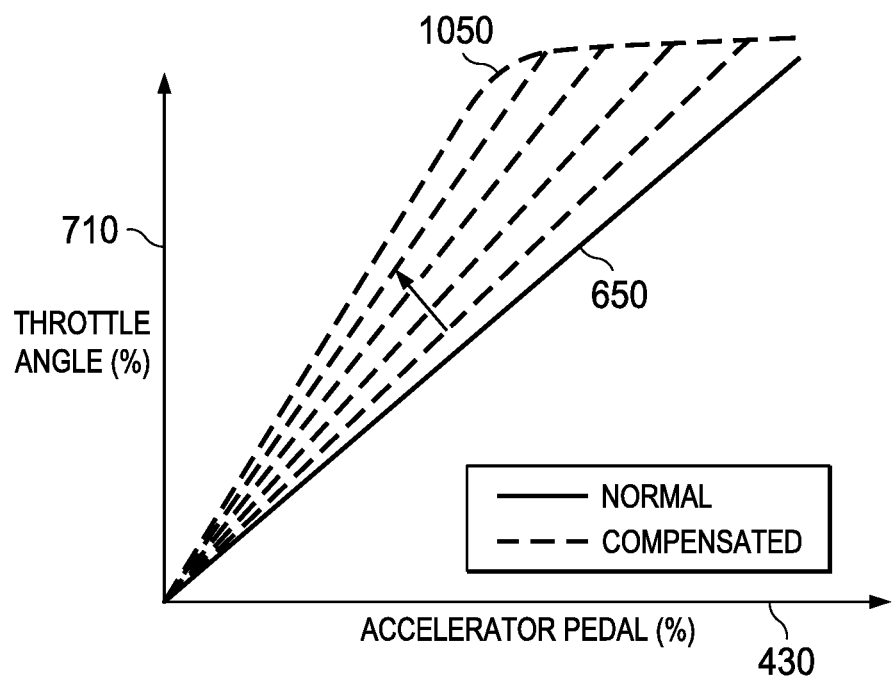
FIG. 10 is a diagrammatic representation of exemplary acceleration compensation logic of the vehicle acceleration compensation system in accordance with at least one embodiment of the present disclosure.

FIG. 10 is a diagrammatic representation of another aspect of an exemplary throttle mapping 650 of the vehicle acceleration compensation system 100 in accordance with at least one embodiment of the present disclosure. As compared with FIG. 8, the linear relationship 650 between accelerator pedal position 430 and throttle angle (shown by the solid line 650) may be compensated to a more complex curve (shown by the dotted lines 1050) based on a computed acceleration requirement. Although the exemplary compensated curves 1050 retain the same endpoints as the uncompensated line, i.e., a 0% pedal deflection 430 still results in an approximate 0% throttle angle 710 above the idle position, and a 100% pedal deflection 430 (i.e., fully depressed accelerator pedal) still results in approximately a 100% throttle angle (i.e., fully open throttle valve). However, in the example shown in curve 1050, for pedal positions 430 less than about 66%, the slope of the throttle angle vs. pedal angle curves 1050 is steeper than that of the line 650, and for pedal positions closer to 100%, the slope of the throttle angle vs. pedal angle curves 1050 is shallower than that of the line 650, resulting in greater overall throttle opening, but less change in throttle angle 710 as the pedal angle 430 is increased or decreased. This combination of features improves the acceleration profile 410 by making it look more like the ideal acceleration profile 410 shown in FIG. 4a and less like the acceleration profile 410 shown in FIG. 4b and FIG. 5. Curves 1050 show different compensated throttle mappings, based on different input parameters or different calculations.

Each exemplary dotted line 1050 shows a snapshot of the throttle mapping 1050 for a particular vehicle at a particular instant under particular conditions. It should be understood that in some embodiments of the acceleration compensation system 100 of the present disclosure, the acceleration compensation engine 142, VCU 110, and/or power train ECU 113 continuously recalculate the compensated throttle mapping 1050 in real time based on the engine torque impacts 680 that are detected at that particular instant.

Figure 11A:
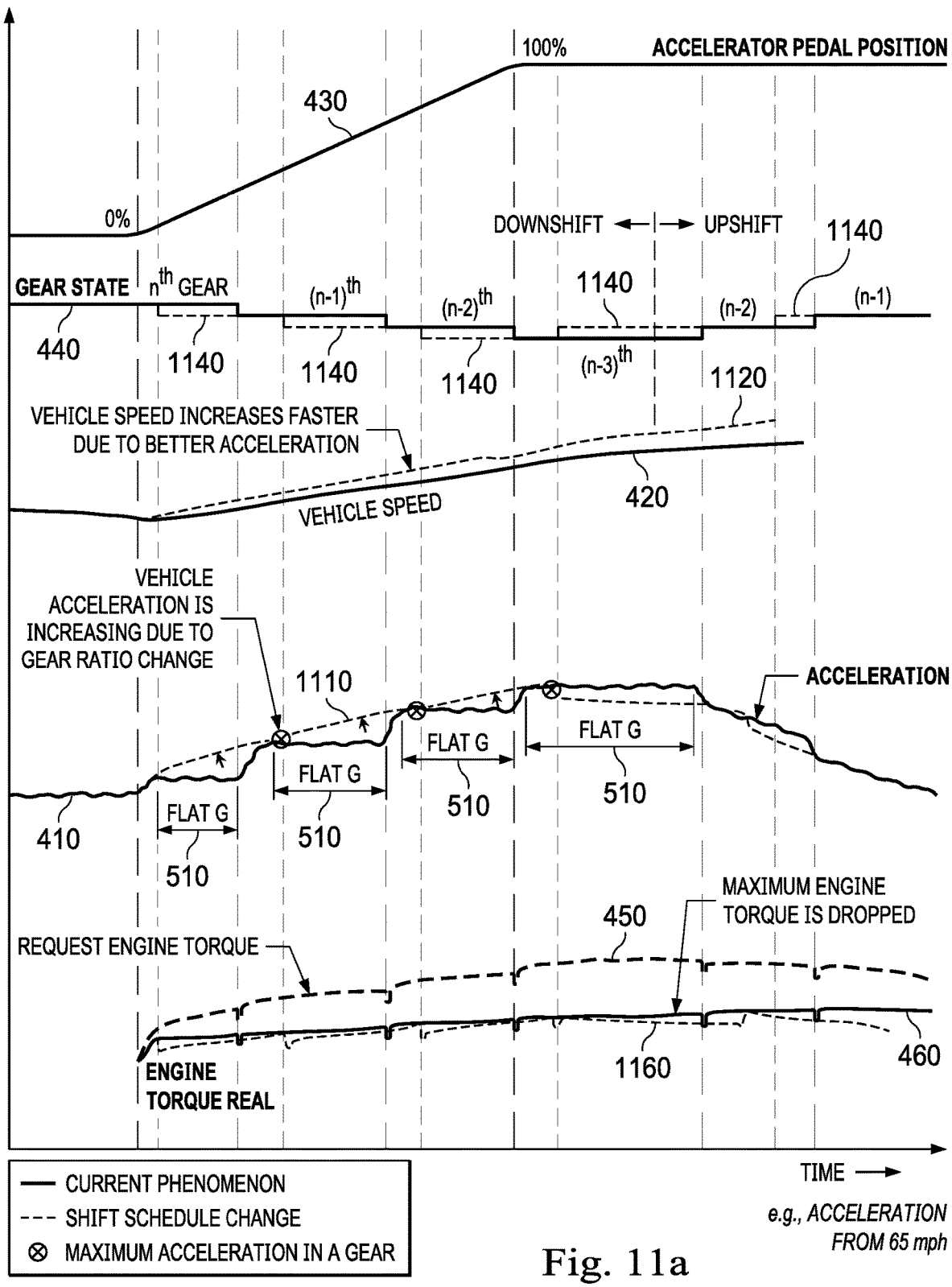
FIG. 11a is a diagrammatic representation of another aspect of the vehicle acceleration compensation system in accordance with at least one embodiment of the present disclosure.

FIG. 11a is a diagrammatic representation of another aspect of the vehicle acceleration compensation system 100 in accordance with at least one embodiment of the present disclosure. The solid lines in the figure depict example pedal position 430, gear selection 440, and vehicle acceleration 410 for a smooth pedal increase beginning at a cruising speed 270 of, for example, 65 miles per hour. The performance of the drivability compensated vehicle 105 is depicted by the dotted lines 1110 for acceleration and 1140 for gear selection. As can be seen in the figure, beginning at the example cruising speed (e.g., 65 mph), the accelerator pedal 430 is depressed smoothly from a 0% deflection position to a 100% deflection position over a first time period, and then held at 100% deflection for a second time period.

As a result of the shift schedule compensation (an example of which is depicted in FIG. 9), the acceleration compensation system 100 commands an early shift schedule. As a result of both the throttle angle compensation or engine torque compensation 794 (an example of which is depicted in FIG. 10) and the shift schedule compensation 796 (an example of which is depicted in this figure, and another example of which is depicted in FIG. 9), the acceleration profile 1110 eliminates or substantially reduces the flat spots 510, and reaches maximum speed earlier, as compared with the uncompensated acceleration curve 410. In addition, the compensated acceleration profile 1110 exhibits smaller and earlier sharp increases 515 than does the uncompensated acceleration profile 410. This compensated acceleration profile 1110 is more in line with desired acceleration profile 410 depicted in FIG. 4a, and thus results in a more satisfactory driving experience.

Also visible is the speed 420 that would occur without acceleration compensation, and the compensated speed 1120 that occurs when the acceleration compensation system 100 is active. As can be seen, the compensated speed 1120 is higher than the uncompensated speed 420, due to a higher average acceleration wherein the flat spots 510 have been replaced with smooth, upward-trending curves.

Additionally, visible are the requested engine torque 450 and the actual available torque 460, as seen in FIG. 11a, and the compensated torque 1160, which in this example is lower than the uncompensated torque 460.

Figure 11B:
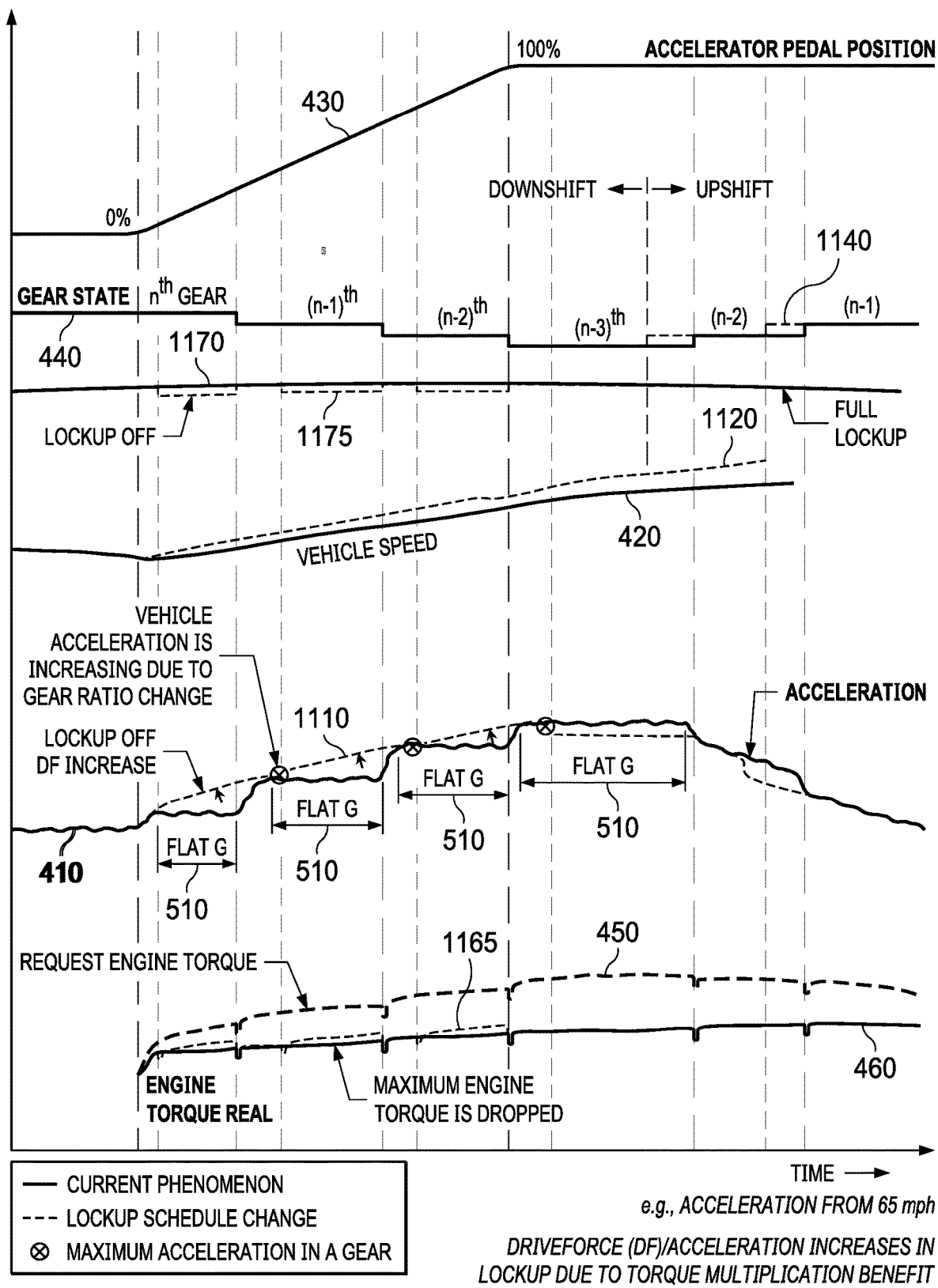
FIG. 11b is a diagrammatic representation of another aspect of the vehicle acceleration compensation system in accordance with at least one embodiment of the present disclosure.

FIG. 11b is a diagrammatic representation of another aspect of the vehicle acceleration compensation system 100 in accordance with at least one embodiment of the present disclosure. As with FIG. 11a, this example shows a vehicle accelerating from a nonzero cruising speed (e.g., 65 mph). Visible are the accelerator pedal position 430, gear selection 440, compensated gear selection 1140, vehicle speed 420 and compensated vehicle speed 1120, acceleration 410 and compensated acceleration 1110, requested torque 450, available torque 460, and compensated torque 1165. As can be seen, in this example the compensated torque 1165 is generally higher than the uncompensated torque 460.

Also visible is an uncompensated lockup schedule 1170, which is a "full lockup" condition wherein the transmission 200 remains in lockup throughout the depicted time period. By contrast, the compensated lockup schedule 1175 drops from a lockup condition (where the line overlaps with line 1170) to an unlocked condition (low points where line 1175 falls below line 1170) during the early portion of the depicted time period. During the later portion of the depicted time period, the acceleration compensation system 100 switches from lockup schedule compensation to shift schedule compensation, as can be seen by the convergence of lines 1170 and 1175, and the divergence of lines 440 and 1140.

Figure 12:
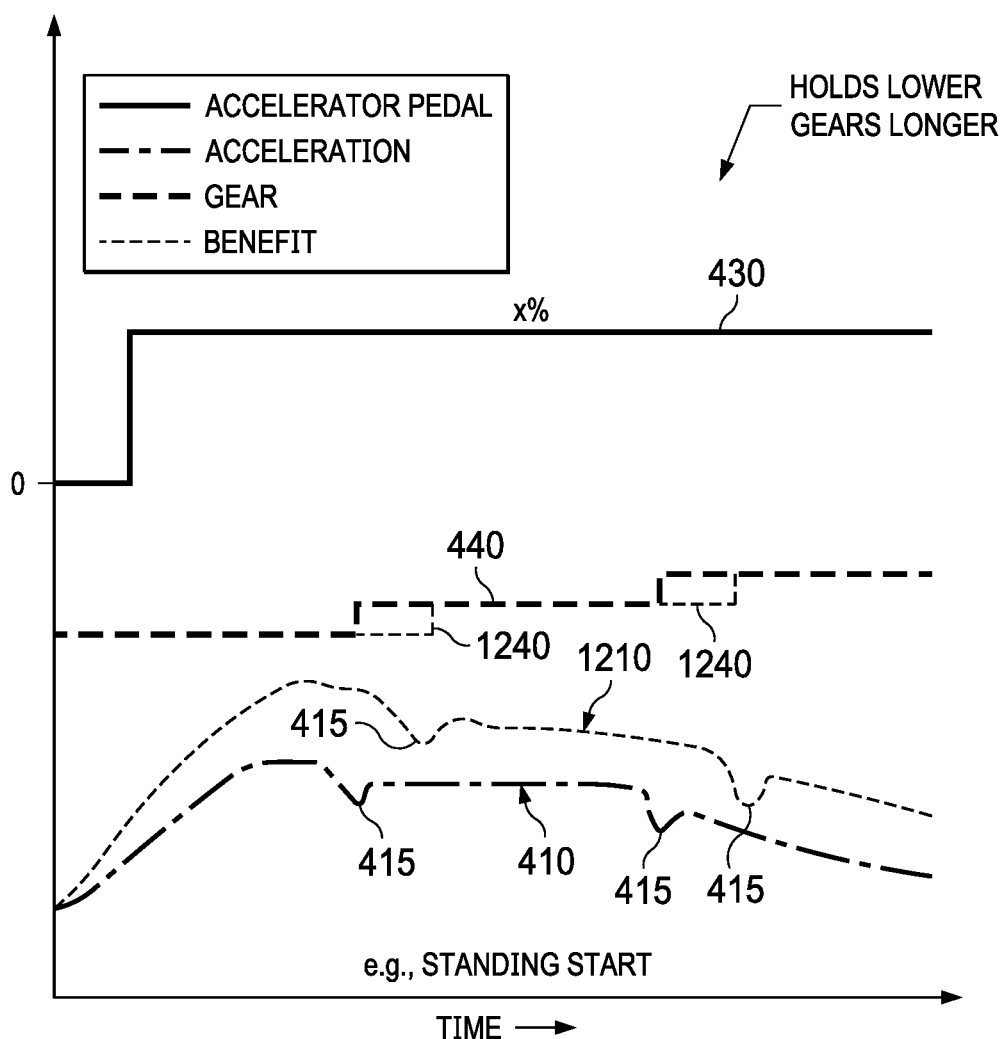
FIG. 12 is a diagrammatic representation of another aspect of the vehicle acceleration compensation system in accordance with at least one embodiment of the present disclosure.

FIG. 12 is a diagrammatic representation of another aspect of the vehicle acceleration compensation system 100 in accordance with at least one embodiment of the present disclosure. The solid lines in the figure depict example pedal position 430, uncompensated gear selection 440, and uncompensated vehicle acceleration 410 for a standing start involving a step-function increase of the accelerator position 430. The dotted lines in the figure depict example compensated gear selection 1240 and compensated acceleration profile 1210.

As can be seen in the figure, the compensated upshifts 1240 from first gear to second gear, and from second gear to third gear, happen later than do the uncompensated shifts 440, meaning the vehicle acceleration compensation system 100 commands the transmission to hold a lower gear 440 for longer. The resulting acceleration profile 1210 exhibits smaller gear-shift-related dips 415, and also pushes the gear-shift-related dips 415 later in time, and results in higher overall acceleration and a later acceleration peak than in the uncompensated acceleration profile 410. This acceleration profile 1210 is more in line with user expectations exhibited in FIG. 4*a*, and thus results in a more satisfactory driving experience.

A number of variations are possible on the examples and embodiments described above. For example, the technology described herein may be implemented on manually controlled vehicles or driver-assist vehicles, or may control a shift-assist feature in vehicles with manual or semi-manual transmissions. The recalculation of throttle mapping, shift mapping, or lockup mapping need not be continuous, but may occur intermittently, or on a regular or irregular schedule. The technology described herein may be implemented in diverse combinations of hardware, software, and firmware, depending on the implementation or as necessitated by the structures and modules already present in existing vehicles. The system may be employed on vehicles with automatic transmission. The system (excluding lockup schedule change) may be also implemented on dual clutch transmission (DCT) vehicles. Other names for DCT include PDK (Porsche), DSG (VW), and MDCT (BMW). The acceleration compensation for transmission shift schedule including lockup schedule may be applied to vehicles with simulated shifting, including continuously variable transmission (CVT), infinitely variable transmission (IVT), and hybrid transmissions (e.g., a hybrid vehicle with 4-speed automatic transmission simulating 10 gears). The lockup schedule compensation aspects of the system may be applied to diverse transmission types that include a torque converter. The throttle mapping aspects of the system may be applied to any vehicle with an internal combustion engine, regardless of mated transmission type. In this case, the transmission may be manual, CVT, IVT, etc.

Accordingly, the logical operations making up the embodiments of the technology described herein may be referred to variously as operations, steps, objects, elements, components, or modules. Furthermore, it should be understood that these may be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vehicle acceleration compensation system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the vehicle acceleration compensation system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, additional sensors such as weight sensors, inclinometers, magnetometers, GPS, and accelerometers may be employed to compute wind load and other related parameters that affect vehicle response and therefore the desired engine torque compensation and shift timing change. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure. The principles described above can be equally applied to electric vehicles by a person of ordinary skill in the art, wherein the throttle is an electric motor voltage or current selection.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle acceleration compensation system, comprising:
   an accelerator pedal disposed within a vehicle and having an accelerator pedal position;
   a control unit disposed within the vehicle and configured to receive real-time sensor data from one or more sensors, the control unit comprising:
   a real-time throttle map relating the accelerator pedal position to a throttle position, such that a given accelerator pedal position directs a corresponding target throttle position; and
   a real-time shift map relating a desired transmission gear to a current transmission gear, current vehicle speed, and current throttle position, such that a given vehicle speed, given throttle position, and given transmission gear directs a corresponding target transmission gear,
   wherein in response to the real-time sensor data, the control unit updates the real-time throttle map and real-time shift map such that a torque of the vehicle is altered to a desired torque value via the throttle position and target transmission gear.

2. The system of claim 1, further comprising a real-time lockup map relating a torque converter lockup condition to the transmission gear, vehicle speed, and throttle position, such that the given vehicle speed, given throttle position, and given transmission gear directs a corresponding lockup condition selected from locked or not locked, wherein in response to the real-time sensor data, the control unit updates the real-time lockup map.

3. The system of claim 2, wherein the desired torque value is selected to bring the vehicle acceleration into closer conformance with a desired vehicle acceleration profile.

4. The system of claim 2 wherein the desired torque value is selected to reduce a size or a duration of an increase in vehicle acceleration, or to reduce a period of time wherein the vehicle acceleration is flat.

5. The system of claim 1, wherein the real-time sensor data comprises at least two of ambient air temperature data, ambient air pressure data, ambient air humidity data, or elevation data.

6. The system of claim 1, wherein the real-time sensor data comprises at least one of engine air temperature data, or accessory load ta.

7. The system of claim 1, wherein the real-time throttle map is nonlinear.

8. The system of claim 1, wherein the real-time throttle map is further dependent on the shift direction.

9. A method for adjusting a torque of a vehicle to compensate for environmental conditions, the method comprising:
    measuring a speed and acceleration of the vehicle;
    measuring an accelerator pedal position of the vehicle;
    controlling a throttle of the vehicle based on the accelerator pedal position and a throttle mapping that relates the accelerator pedal position to a throttle position, wherein the throttle position is correlated to a motor power;
    controlling a transmission of the vehicle to shift in a shift direction from one fixed transmission gear to a selected fixed transmission gear based on a shift mapping that relates a desired transmission gear to the speed of the vehicle and the accelerator pedal position, wherein each transmission gear relates the motor power to a vehicle torque;
    modifying the throttle mapping in real time based on real-time sensor data; and
    modifying the shift mapping in real time based on the real-time sensor data,
    such that the vehicle torque is altered to a desired torque value via the throttle position and the selected transmission gear.

10. The method of claim 9, wherein the desired torque value is selected to bring an acceleration of the vehicle into closer conformance with a desired vehicle acceleration profile.

11. The method of claim 10, wherein the desired torque value is selected to reduce a period of time that the acceleration of the vehicle is flat, or to reduce a size or a duration of an increase in vehicle acceleration.

12. The method of claim 9, wherein the real-time sensor data comprises ambient air temperature data and ambient air pressure data.

13. The method of claim 9, further comprising controlling a torque converter lockup of the vehicle to select a lockup state selected from locked or unlocked, based on a real-time lockup mapping that relates a desired lockup state to the speed of the vehicle, the throttle position, and the selected fixed transmission gear; and
    modifying the real-time lockup mapping in real time based on the real-time sensor data.

14. The method of claim 9, wherein the throttle mapping is further modified based on the shift direction.

15. The method of claim 9, wherein the real-time sensor data comprises any of, accessory load, or ambient humidity.

16. An acceleration compensation apparatus comprising:
    a memory comprising:
    a real-time throttle map relating an accelerator pedal position of a vehicle to a throttle position of the vehicle, such that a given accelerator pedal position directs a corresponding throttle position, wherein a motor power of the vehicle is correlated with the throttle position;
    a real-time shift map relating a desired transmission gear to a current shift direction, vehicle speed, and throttle position, such that a given vehicle speed, throttle position, shift direction and transmission gear directs a corresponding transmission gear, wherein a torque of the vehicle is correlated with the motor power and the transmission gear;
    one or more sensors disposed within the vehicle and configured to provide real-time sensor data; and
    a processor which, in response to the real-time sensor data, updates the real-time throttle map and real-time shift map such that the torque of the vehicle is altered to a desired torque value via the throttle position and corresponding transmission gear.

17. The apparatus of claim 16, wherein the desired torque value is selected to bring an acceleration of the vehicle into closer conformance with a desired vehicle acceleration profile by reducing a period of time that the acceleration of the vehicle is flat, or reducing a size or a duration of an increase in vehicle acceleration.

18. The apparatus of claim 16, wherein the real-time sensor data comprises at least one of ambient air temperature ambient air pressure, accessory load, or ambient humidity.

* * * * *